US011887576B2

(12) United States Patent
Rui et al.

(10) Patent No.: US 11,887,576 B2
(45) **Date of Patent: *Jan. 30, 2024**

(54) AMBIENT DETECTOR FOR DUAL MODE ANC

(71) Applicant: Google LLC, Mountain View, CA (US)

(72) Inventors: Steve Rui, Irvine, CA (US); Govind Kannan, Irvine, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,295

(22) Filed: Oct. 7, 2022

(65) Prior Publication Data

US 2023/0146322 A1 May 11, 2023

Related U.S. Application Data

(63) Continuation of application No. 17/123,097, filed on Dec. 15, 2020, now Pat. No. 11,468,875.

(51) Int. Cl.
*G10K 11/178* (2006.01)

(52) U.S. Cl.
CPC .. *G10K 11/17873* (2018.01); *G10K 11/17823* (2018.01); *G10K 11/17857* (2018.01); *G10K 2210/1081* (2013.01); *G10K 2210/3027* (2013.01); *G10K 2210/3028* (2013.01)

(58) Field of Classification Search
CPC ....... G10K 11/17873; G10K 11/17823; G10K 11/17857; G10K 2210/1081; G10K 2210/3027; G10K 2210/3028; G10K 11/1783; G10K 2210/503
See application file for complete search history.

(56) References Cited

U.S. PATENT DOCUMENTS

| | | | | |
|---|---|---|---|---|
| 9,264,808 | B2 | 2/2016 | Zhou et al. | |
| 10,586,523 | B1 | 3/2020 | Kohler et al. | |
| 10,720,141 | B1 | 7/2020 | Rugolo et al. | |
| 10,721,562 | B1 | 7/2020 | Rui et al. | |
| 11,468,875 | B2 * | 10/2022 | Rui | G10K 11/1783 |
| 2007/0030989 | A1 | 2/2007 | Kates | |

(Continued)

FOREIGN PATENT DOCUMENTS

EP 3672274 A1 6/2020

OTHER PUBLICATIONS

International Search Report and Written Opinion for PCT/US2021/063246 dated Mar. 29, 2022, all pages.

*Primary Examiner* — Ping Lee
(74) *Attorney, Agent, or Firm* — Kilpatrick Townsend & Stockton LLP

(57) ABSTRACT

Active noise cancellation systems and methods include a feedforward path configured to receive a reference signal comprising ambient noise and adaptively generate an anti-noise signal to cancel the ambient noise. The adaptive filter is tuned in accordance with at least one parameter, which is set by a logic device configured to determine an ambient noise condition based the reference signal by estimating a fullband power of the reference signal, estimating a low-frequency power of the reference signal, comparing the fullband power and low-frequency power to one or more thresholds, and/or setting one or more ambient noise flags. The ambient noise condition may include a quiet background, a wideband noise condition, and/or a low-frequency dominant noise condition.

20 Claims, 10 Drawing Sheets

(56) References Cited

U.S. PATENT DOCUMENTS

| | | | |
|---|---|---|---|
| 2017/0110105 | A1 | 4/2017 | Kumar et al. |
| 2019/0069074 | A1 | 2/2019 | Yamkovoy |
| 2020/0288244 | A1 | 9/2020 | Alcock |
| 2020/0296500 | A1 | 9/2020 | Wang |

* cited by examiner

AMBIENT DETECTOR FOR DUAL MODE ANC

CROSS-REFERENCE TO RELATED APPLICATION

This application is a continuation of U.S. Non-Provisional application Ser. No. 17/123,097, filed Dec. 15, 2020, which is hereby incorporated by reference in its entirety for all purposes.

TECHNICAL FIELD

The present application relates generally to noise cancelling systems and methods, and more specifically, for example, to active noise cancelling (ANC) systems and methods for use in headphones (e.g., circum-aural, supra-aural and in-ear types), earbuds, hearing aids, and other personal listening devices.

BACKGROUND

Active noise cancellation (ANC) systems commonly operate by sensing noise through a reference microphone and generating a corresponding anti-noise signal that is approximately equal in magnitude, but opposite in phase, to the sensed noise. The noise and anti-noise signal cancel each other acoustically, allowing the user to hear only a desired audio signal. To achieve this effect, a low-latency, filter path from the reference microphone to a loudspeaker that outputs the anti-noise signal may be implemented. In operation, conventional anti-noise filtering systems do not completely cancel all noise, leaving residual noise and/or generating audible artefacts that may be distracting to the user. In some implementations, the user may desire to selectively listen to certain external noises, which can affect ANC adaption and other processing. Performance of these active noise cancellation systems may be further degraded due to leakage, which may vary from person-to-person and device-to-device due to the various ways that a listening devices couples to the user's anatomy. Moreover, an ANC system that is configured to provide optimal noise cancellation for a particular environment and may not provide acceptable noise cancellation in other environments, such as varying environments as a person traverses a city.

In view of the foregoing, there is a continued need for improved active noise cancellation systems and methods for headphones, earbuds and other personal listening devices, that may be used in varying listening environments.

SUMMARY

Systems and methods are disclosed for improved active noise cancellation in personal listening devices. In various embodiments, for example, active noise cancellation systems and methods provide improved adaptation to varying environments.

In some embodiments, an active noise cancellation system comprises a feedforward path comprising an adaptive filter configured to receive a reference signal comprising ambient noise and adaptively generate an anti-noise signal to cancel the ambient noise, wherein the adaptive filter is tuned in accordance with at least one parameter, and a logic device configured to determine an ambient noise condition based at least in part on the reference signal and adjust the at least one parameter to tune the adaptive filter. The active noise cancellation system may further comprise an audio sensor configured to sense the ambient noise and generate the reference signal.

The logic device is configured to determine the ambient noise condition and set an ambient sound mode for operating the active noise cancellation system by estimating a fullband power of the reference signal, estimating a low-frequency power of the reference signal, determining a value for the at least one parameter corresponding to the current ambient sound mode, and using the parameter to tune the adaptive filter to the current ambient sound mode. In some embodiments, the logic device is configured to determine a current ambient sound mode based on one or more flags set based at least in part on a determined fullband power of the reference signal and/or a determined low-frequency power of the reference signal. The one or more flags may comprise a lowpass flag set based at least in part on a comparison of the low-frequency power to a predetermined threshold, and/or a fullband flag set based at least in part on a comparison of the fullband power to a first predetermined threshold. The ambient noise condition may comprise a quiet background, a wideband noise condition, and/or a low-frequency dominant noise condition.

In some embodiments, a method comprises receiving a reference signal comprising ambient noise, adaptively generating an anti-noise signal using an adaptive filter to cancel the ambient noise in a noise cancellation zone, determining an ambient noise condition based at least in part on the reference signal, and tuning the ambient noise condition based at least in part on the ambient noise condition. Determining the ambient noise condition may comprise estimating a fullband power of the reference signal, estimating a low-frequency power of the reference signal, and/or determining a current ambient sound mode based at least in part on a fullband power of the reference signal and a low-frequency power of the reference signal.

In some embodiments, tuning the adaptive filter comprises determining a value for at least one parameter corresponding to the current ambient sound mode, and adjusting an operating condition of the adaptive filter based at least in part on the value of the at least one parameter. Determining the ambient noise condition may further comprise setting one or more flags based at least in part on a determined fullband power of the reference signal and/or a determined low-frequency power of the reference signal, and setting the one or more flags may comprise setting a lowpass flag set based at least in part on a comparison of the low-frequency power to a predetermined threshold, and/or setting a fullband flag based at least in part on a comparison of the fullband power to a first predetermined threshold.

The scope of the disclosure is defined by the claims, which are incorporated into this section by reference. A more complete understanding of embodiments of the disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Aspects of the disclosure and their advantages can be better understood with reference to the following drawings and the detailed description that follows. It should be appreciated that like reference numerals are used to identify like elements illustrated in one or more of the figures, wherein showings therein are for purposes of illustrating embodiments of the present disclosure and not for purposes of limiting the same. The components in the drawings are not necessarily to scale, emphasis instead being placed upon clearly illustrating the principles of the present disclosure.

DETAILED DESCRIPTION

Figure 1:
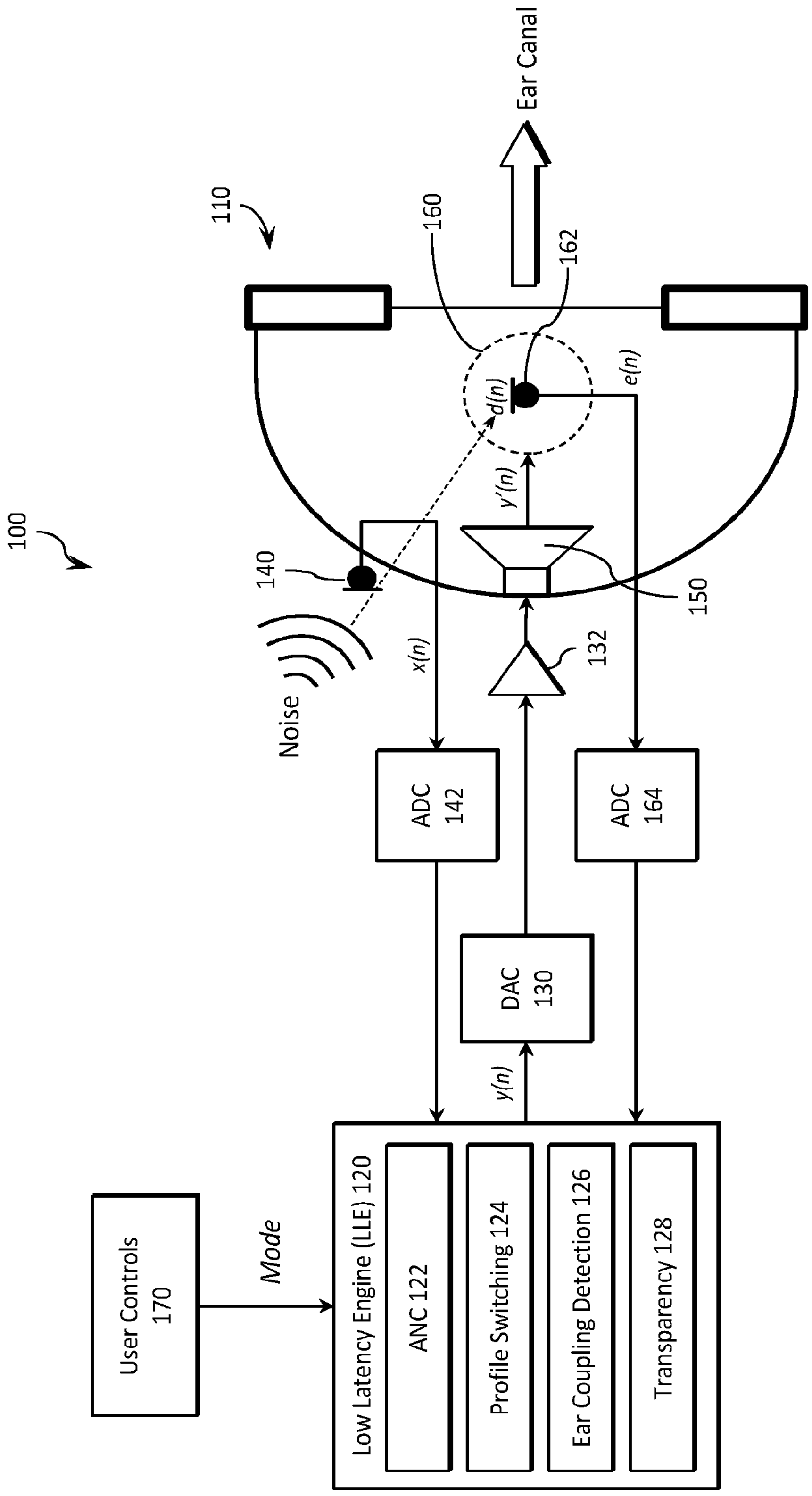
FIG. 1 illustrates an active noise cancellation device, in accordance with one or more embodiments of the present disclosure.

In accordance with various embodiments, improved active noise cancellation (ANC) systems and methods are disclosed. An ANC system for a headphones, earbuds or other personal listening devices may include a noise sensing reference microphone for sensing ambient noise external to the personal listening device, an error microphone for sensing an acoustic mixture of the noise and anti-noise generated by the ANC system, and a low latency signal processing subsystem that generates the anti-noise to cancel the sensed ambient noise. The signal processing sub-system may be configured to adapt the anti-noise signal in real-time to the ambient noise, the coupling of the personal listening device with respect to the user, user-selectable modes and other factors to achieve consistent noise cancellation performance.

In various embodiments, the systems and methods disclosed herein improve cancellation of ambient noise under various listening environments and conditions. In some embodiments, ear coupling and leakage scenarios are considered to further improve processing of ambient noise. In some embodiments, a transparency mode is included that passes through some or all of the ambient noise to the user and reduces related adaptation artefacts perceptible by the user.

In some embodiments, detector circuitry/logic is incorporated into the ANC system to monitor the ambient noise spectrum shape and select an appropriate ANC mode. The personal listening device is equipped with an external microphone to receive an ambient noise signal x. A first power estimation module tracks the fullband power at p 1, and a second power estimation module tracks the low frequency power as p2. A logic module or circuitry determines the environmental noise type based on pl and p2 and output ANC mode flags indicating the current detected ambient noise condition.

In various embodiments, the system uses a power estimation module to track long term ambient noise. The noise power estimate pl and p2 can configured to ignore short-term bursts of noise (e.g., a door slam, a keyboard click, etc.). Various estimation methods may be used including (i) exponential smoothing (e.g., $p=(1-+ax^2)$; (ii) a release window method, where p is the minimum, median, a certain percentile of $x^2$ within a predetermine release window (e.g., 1 second); and/or (iii) long-short dual trackers, where the system uses a long-term power tracker to update p towards a long-term goal P by $p=(1-alon_g)p+aion_gP$, and the system uses a short-term power tracker to evaluated noise statistics and update P. Examples of a short-term power tracker include, but are not limited to:

$P_{short}=(1-a_{mort})+P_{short}\ x^2$, where the system updates $P=f(P_{short})$ if $P_{short}$ and P are close;

$P_{short}=x^2$, where the system updates $P=f(P_{short})$ if the $P_{short}$ distribution satisfies the requirement in a release window; and/or $f(P_{short})$ is a function of $P_{short}$, e.g. average, minimum, or any other linear or nonlinear functions.

In various embodiments, the logic module translates the power estimates pl and p2 to ANC mode flags. In the illustrated embodiments, the logic module includes thresholds that are compared against the measured power estimates to set each flag. For example, if p1 is greater than a first threshold, then the first flag is set to "on", otherwise the first flag is set to "off". If is greater than a second threshold and p1-p2 are less than a third threshold, then a second flag is set, otherwise, the second flag is off. If the flags are both off, then the ANC system is operating in a quiet environment and the ANC may be turned off. If only the second flag is turned on, then an error is detected, and the ANC returns to a default mode of operation. If the first flag is on and the second flag is off, then wideband noise is detected and the ANC operation switches to a wideband tuning. If both flags are on, then low-frequency dominant noise is detected and the ANC system switches to a low-frequency tuning.

The systems and methods disclosed herein reduce unwanted environment noise using improved ANC techniques. A personal listening device such as a headphone or earbud, generates a waveform that is the negative (opposite phase) of the detected environmental sound to attenuate noise that arrives at the ear canal. The noise cancellation performance is limited by many factors such as the headphone acoustic device, environmental sound type, and ANC tuning. In practice, different ANC tuning parameters may be optimal for different environmental conditions. In embodiments disclosed herein, the ANC system is configured to switch among various ANC tuning in accordance with environmental sound types that may be detected. For example, an ANC system may include a first tuning mode configured to attenuate wideband environmental noise typically found in a bar, restaurant, office or similar setting, and a second tuning mode configured to attenuate environmental noise in environments dominated by low-frequency noises found in airplanes, trains and similar settings.

It is further recognized that high leakage can result breakdown of ANC performance. For example, a feedback ANC path tracks and adapts to an error microphone signal, which may typically provide a good measure of ANC performance at the user's ear drum. However, in the presence of higher leakage, the loudspeaker may not be physically able to push enough air to achieve desired performance at the ear drum. The present disclosure addresses these and other leakage issues by having fixed ANC profiles tuned for different leakage scenarios. The leakage is tracked by tracking the gain value of an adaptive gain control block, which is then used to select an appropriate leakage profile.

Improved adaptive systems and methods disclosed herein include an adaptive gain filter in a feedforward path to generate a robust anti-noise signal. An adaptation engine is configured to receive the reference signal and the error signal and control various components of the active noise cancellation system, including adaptively adjusting weights of a feedforward adaptive noise cancellation filter and/or the adaptive gain filter. In various embodiments, leakage control logic is configured to track parameters related to the adaptive gain filter and to provide improved leakage control.

In various embodiments, the adaptation engine includes leakage control logic configured to track adaptive gain parameters of the adaptive gain filter and select optimal leakage control settings based on the adaptive gain value. In some embodiments, the adaptation engine is configured with a plurality of pre-configured user leakage profiles adapted for a corresponding plurality of leakage conditions relating to the positioning and/or fit of the listening device with respect to the user's anatomy. The user leakage profiles may include modeling for a tight seal between a personal listening device and the user's ear, and modeling of one or more leakage paths associated with leaky device positions and/or fit conditions. In various embodiments, the adaptation engine is configured to track one or more adaptive gain parameters and automatically switch between user leakage profiles based on changes detected in the adaptive gain parameters for optimal filtering.

In various embodiments, the ANC system further includes a second feedforward processing path configured to generate a transparency output. A transparency mode may be selected by the user to allow certain ambient noise to pass through the system for playback by the personal listening device and may be used with and/or without enablement of ANC processing. This transparency processing path is configured to process the transparency output in parallel with a feedforward processing path of the ANC system. In some embodiments, the transparency processing path includes an adaptive transparency filter configured to generate the transparency output in accordance with one or more conditions, including but not limited to, settings associated with an active leakage profile. The adaptation engine and/or other control logic is configured to detect a user input selection of a listening mode associated with a transparency mode and/or ANC mode and selectively enable or disable the transparency output.

Example embodiments of active noise cancelling systems of the present disclosure will now be described with reference to the figures. Referring to FIG. 1, an active noise cancelling system 100 includes a personal listening device 110 and audio processing components, which may include a low latency engine (LLE) 120, a digital to analog converter (DAC) 130, an amplifier 132, a reference audio sensor 140, a loudspeaker 150, an error sensor 162, and/or other components.

In operation, a listener may hear external noise d(n), which may pass through the housing and components of the personal listening device 110. To cancel the noise d(n), the reference audio sensor 140 senses the external noise, producing a reference signal x(n) which is fed through an analog-to-digital converter (ADC) 142 to the LLE 120. The LLE 120 may include hardware and/or software configured to generate an anti-noise signal y(n), which is fed through the DAC 130 and the amplifier 132 to the loudspeaker 150 to generate anti-noise in a noise cancellation zone 160. The noise d (n) will be cancelled in the noise cancellation zone 160 when the anti-noise is equal in magnitude and opposite in phase to the noise d(n) in the noise cancellation zone 160. The resulting mixture of noise and anti-noise is captured by the error sensor 162 which generates an error signal e(n) to measure the effectiveness of the noise cancellation. The error signal e (n) is fed through ADC 164 to the LLE 120, which adapts the anti-noise signal y(n) to minimize the error signal e(n) within the cancellation zone 160 (e.g., drive the error signal e(n) to zero). In some embodiments, the loudspeaker 150 may also generate desired audio (e.g., music) which is received by the error sensor 162 and removed from the error signal e(n) during processing.

In various embodiments, the personal listening device 110 may include headphones (e.g., circum-aural, supra-aural and in-ear types), earbuds, hearing aids, and other personal listening devices. The personal listening device 110 may be a standalone device, such as a hearing aid, or be implemented as an audio listening device connected (e.g., physically and/or wirelessly) to one or more external devices, such as a computer (e.g., desktop, laptop, notebook, tablet), mobile phone, audio playback device (e.g., an MP3 player), video game system, or another device. The reference audio sensor 140 and the error sensor 162 may comprises one or more audio sensors, transducers, microphones or other components configured to detect a sound and convert the detected sound into an electrical audio signal.

The LLE 120 may include a single sample processor, digital signal processor, a controller, a central processing unit with program instructions stored in memory, and/or other logic device configured to perform one or more of the processes disclosed herein. The LLE 120 may include programmed logic and/or hardware components for causing the LLE 120 to perform certain processes including ANC processing (e.g., through ANC logic 122), profile switching (e.g., through profile switching logic 124), detection of ear coupling status, such as leakage (e.g., ear coupling detection logic 126), and transparency mode enablement and disablement (e.g., transparency logic 128). The LLE 120 may receive instructions, such as ANC and/or transparency mode selection, from user controls 170, which may include one or more physical buttons, sliders, dials or other physical input components, a touchscreen with associated graphical user interface, or other user input device, component or logic.

It will be appreciated that the embodiment of FIG. 1 is one example of an active noise cancellation system and that the systems and methods disclosed herein may be implemented with other active noise cancelling implementations that include a reference microphone and an error microphone. It will further be appreciated that the embodiment of FIG. 1 may be used with additional components in various embodiments, including audio playback components for receiving and generating a playback signal for output (e.g., music, audio from a voice conference) through the loudspeaker 150.

Figure 2:
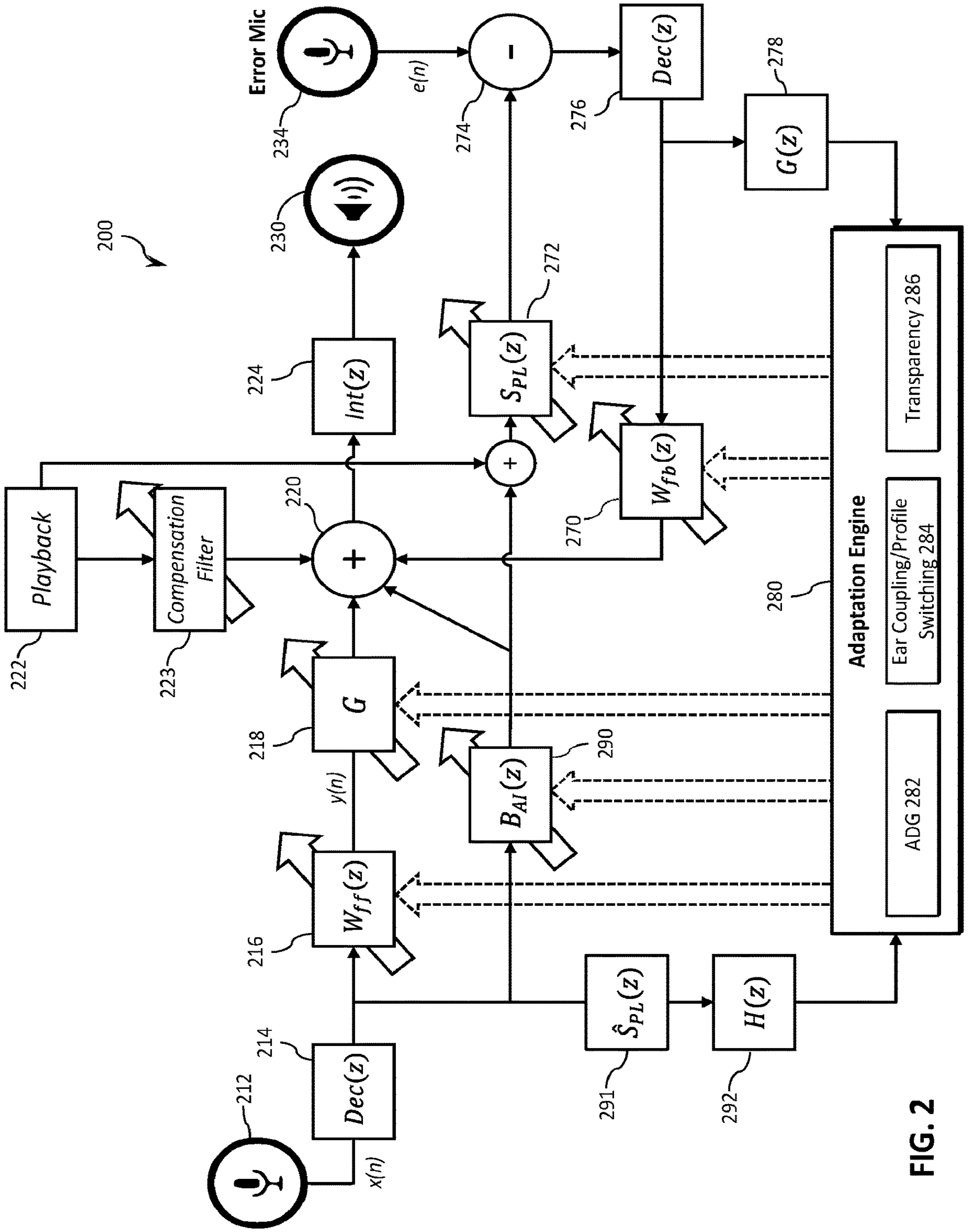
FIG. 2 illustrates an active noise cancellation system, including an adaptive gain filter, profile switching and parallel transparency processing, in accordance with one or more embodiments of the present disclosure.
Figure 3A:
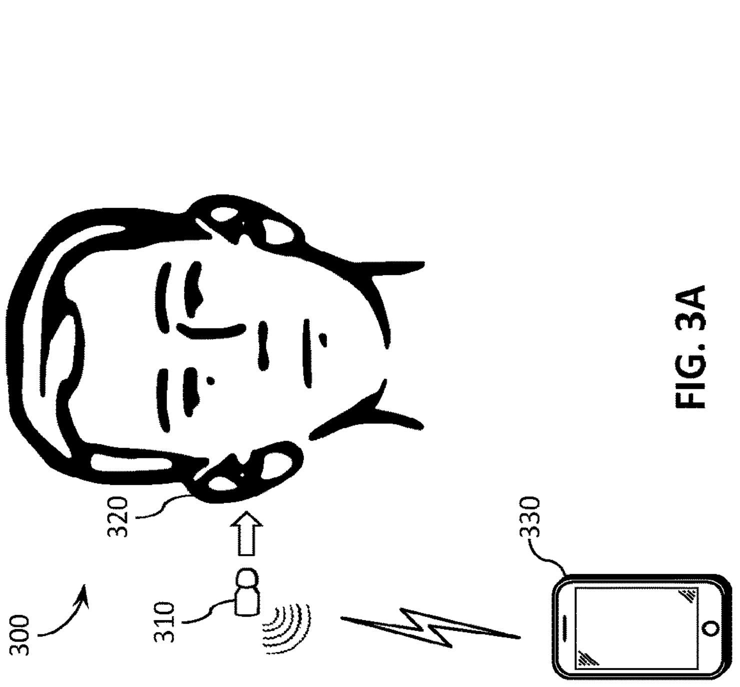
FIGS. 3A, 3B, 3C and 3D illustrate ear coupling of a personal listening device, in accordance with one or more embodiments of the present disclosure.
Figure 3B:
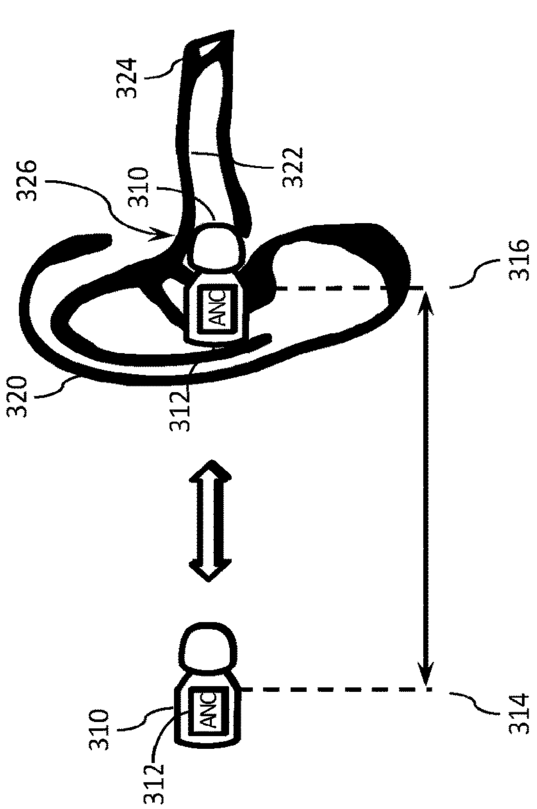
Figure 3C:
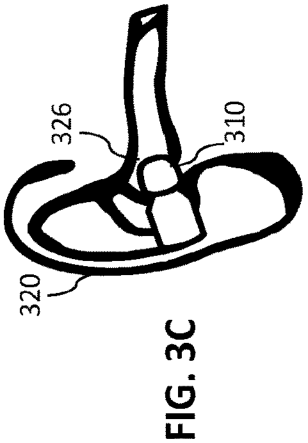
Figure 3D:
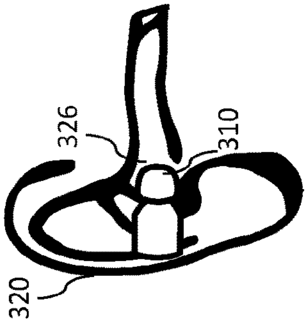

Referring to FIG. 2, example embodiments of ANC processing including ear coupling detection, profile switching, adaptive leakage compensation, and improved transparency signal processing will now be described. An active noise cancelling system 200 is configured to sense ambient noise at a reference sensor, such as an external microphone 212 (e.g., reference audio sensor 140 of FIG. 1), which produces an external noise signal, x(n). The ambient noise also passes through a noise path (e.g., a primary path P(z)), which may include the housing and components of the personal listening device and is received at an error sensor 234 (e.g., an error microphone, such as error sensor 162). As used herein, a primary path P(z) represents a transfer function modeling the acoustic path between the external microphone 212 and the error sensor 234.

The ANC system 200 includes a feedforward path configured to generate the anti-noise signal from the received external noise signal x(n), including a decimator 214 configured to downsample the external noise signal x(n) for processing by the ANC system 200 and a feedforward adaptive filter 216 (Wfj(z)) configured to adaptively estimate the primary path P(z) to produce an anti-noise signal y(n) for cancelling the external noise signal (e.g., d(n)). In various embodiments, the adaptive filter(s) of the present embodiment may be implemented using a least mean square (LMS) process, a filtered LMS (FxLMS) process, an infinite impulse response filter, a finite impulse response, and other filter types as known in the art.

The anti-noise signal y(n) is gain adjusted by adaptive gain filter 218 and mixed (at block 220) with and/or further modified by a playback signal 222 (e.g., voice communications in a VoIP call, music, recorded voice, audio accompanying a video, etc.), a transparency signal generated by an adaptive transparency filter 290 ((BAI(z)), and/or an error signal generated by an feedback adaptive filter 270 ((Wfb (z)) to generate an output signal. The adaptive transparency filter 290 adapts to the reference signal in parallel to generate a transparency signal for playback through the loudspeaker 230 to allow the user to hear all or part of the ambient noise when transparency is enabled. The output signal is upsampled by interpolator 224 for output to a loudspeaker 230.

The error sensor 234 receives a mix of the output signal, including desired audio (e.g., a playback signal, an ambient inclusion signal from a transparency processing path) and the anti-noise signal, and the external noise d(n) received by the error sensor 234 through the primary path P(z). The playback signal 222 (and transparency signal if transparency mode is active) is adjusted to account for the secondary path through adaptive filter 272 and removed from the error signal at block 274. As used herein, a secondary path S(z) represents a transfer function modeling the electrical path (e.g., D/A, A/D, etc.) and acoustic path between the loudspeaker and the error sensor. The residual error is downsampled for processing by the ANC system 200 through decimator 276 and provided as an input to feedback adaptive filter 270, which outputs an error correction signal to minimize the residual error.

In the illustrated embodiment, the adaptation engine 280 receives the residual error signal, filtered through a filter 278 (G(z)) that models the transfer function between the loudspeaker 230 and the error sensor 234, and a copy of the reference signal, which is filtered through an estimate of the secondary path 291 and a signal conditioning filter 292 (11(*z*)).

The ANC system 200 further includes an adaptation engine 280, which includes logical components for adaptive gain control (ADG) 282, ear coupling and profile switching 284 and transparency management 286. In various embodiments, the ADG 282 is configured to minimize wide-band fluctuations in the anti-noise path, the ear coupling and profile switching 284 is configured to continually track and compensate for various ear coupling and leakage scenarios and switch to an appropriate filter profile to optimize ANC performance, and the transparency management 286 is configured to adapt transparency performance in the parallel transparency path. In some embodiments, the ear coupling and profile switching 284 tracks current gain parameters from adaptive gain control 218 and modifies the feedforward processing at one or more adaptive filters in the feedforward path to accommodate the current leakage scenario.

In one or more embodiments, the hybrid ANC system 200 is tuned to achieve certain noise cancellation performance. For example, in the feedforward path, the adaptive filters 216 and 218 are pre-tuned and then adapted during operation based on the received audio signal from external microphone 212 to maximize the noise cancellation. In some embodiments, the tuning of the ANC system 200 may be based in a tight seal setup between the personal listening device and the user's ear, such that there is little to no leakage. If there is more leakage (e.g., ear coupling between personal listening device and ear isn't consistent with the modeled tuning), then more low frequency sounds may be sensed and the adaptive gain control 218 will adapt by increasing the gain. It is further recognized that a detected increase in gain on the feedforward path generally corresponds to less coupling and more leakage than expected. In some embodiments, an adaptive gain filter may be placed on the feedback path (see, e.g., FIG. 7) and monitored to detect coupling status and leakage.

Generally, the adaptation engine 280 includes logic for detecting, tracking and adapting to user-related and ambient conditions. User-related conditions may include, for example, tracking the gain adaptation to determine leakage mechanics, and modifying filter parameters in accordance with the determined leakage mechanics. Ambient conditions may include, for example, classifying ambient conditions (e.g., using a neural network classifier) detected through the reference sensor and optimizing filter performance in view of the classified ambient conditions. For example, known ambient conditions that include low frequency noise and/or speech can be modeled and optimized when classified.

Embodiments incorporating ear coupling detection and profile switching will now be described in further detail with reference to FIG. 3A through FIG. 7. Referring to FIGS. 3A-D, a personal listening device, such as a wireless earbud 310, is adapted to fit into an ear 320 of a user 300. In operation, the wireless earbud 310 is operable to communicate wirelessly with a host system, such as mobile device 330. The wireless earbud 310 is designed to be inserted into the user's ear canal 322 (or adjacent thereto) where the audio output from the wireless earbud 310 is sensed at the user's ear drum 324. The wireless earbud 310 includes a wireless transceiver for transmitting and receiving communications (e.g., audio streams) between the wireless earbud 310 and the mobile device 330.

The user 300 will insert and remove the wireless earbud 310 into and from, respectively, the user's ear 320 as desired to listen to audio from the mobile device 330. During this process, the wireless earbud 310 passes between a first position 314 in the open air to a second position 316 where the wireless earbud 310 is securely positioned in the ear 320. In various embodiments, the wireless earbud 310 includes a soft tip (e.g., silicon, memory foam) that is designed to conform to the shape of the ear to create a tight seal that controls leakage. However, in practice when the wireless earbud 310 is positioned in the second position 316, one or more gaps 326 and/or loose couplings/seals may be formed between the wireless earbud 310 and the anatomy of the user's ear 320 resulting in leakage.

Small variations in coupling are expected in practice as a user inserts and removes the wireless earbuds, which can be addressed through the adaptive gain control filter. However, larger gaps 326 may be formed that result in a leaky condition that cannot be accounted for with a gain adjustment, for example, due to the user's particular anatomy, the positioning of the wireless earbud 310 (e.g., a misalignment of the earbud relative to the ear, improper insertion depth, etc.), the size and shape of the wireless earbud 310, changes to the shape of the earbud due to use, the user not recognizing when proper coupling is achieved and/or other factors.

The wireless earbud 310 includes an ANC system 312 to cancel ambient noise and/or passthrough certain ambient noise in a transparency mode. During operation, the adaptive components of the ANC system 312 adapt to optimize ANC performance. In various embodiments, the ANC system 312 includes adaptive gain control filter (e.g., adaptive gain control 218) and adaptive gain control logic (e.g., ADG 282) to adjust the gain of the anti-noise signal to optimize cancellation. It is observed that the gain parameters of the adaptive gain control filter correlate to the level of leakage due to the position and/or fit of the wireless earbud 310 in the user's ear 320. The ADG 282 tracks one or more gain parameters to determine a current gain applied to the anti-noise signal to identify a leakage scenario.

The correlation between gain and leakage conditions can be modeled, for example, by testing position and fit scenarios using a dummy head and optimizing ANC parameters for the detected leakage conditions, by testing people in the general population, by modeling the parameters of the ANC system, and/or other methods. It is observed that for a sample of the population of potential users, leakage scenarios often fall within two or three clusters, and in most cases, four or five clusters may be sufficient for acceptable performance. These clusters or other groupings can be used to define leakage profiles including adaptive filters tuned for the leakage scenario. Because leakage corresponding to the gain is known, filters in the feedforward path (e.g., Wfj(z)), feedback path (e.g., Wjb(z)), transparency path ((e.g., BA/(z)) and/or playback path ((e.g., SPL(z)), for example, can be switched to certain pre-tuned filters representing leakage scenarios based on the detected gain.

In some embodiments, the gain value may be used to detect other conditions such as an open-air condition detected during insertion or removal activities and used to trigger a change in an operation of the wireless earbud 310, such as entering a low power mode, adjusting the output volume, and activating or disabling certain functions.

Figure 4A:
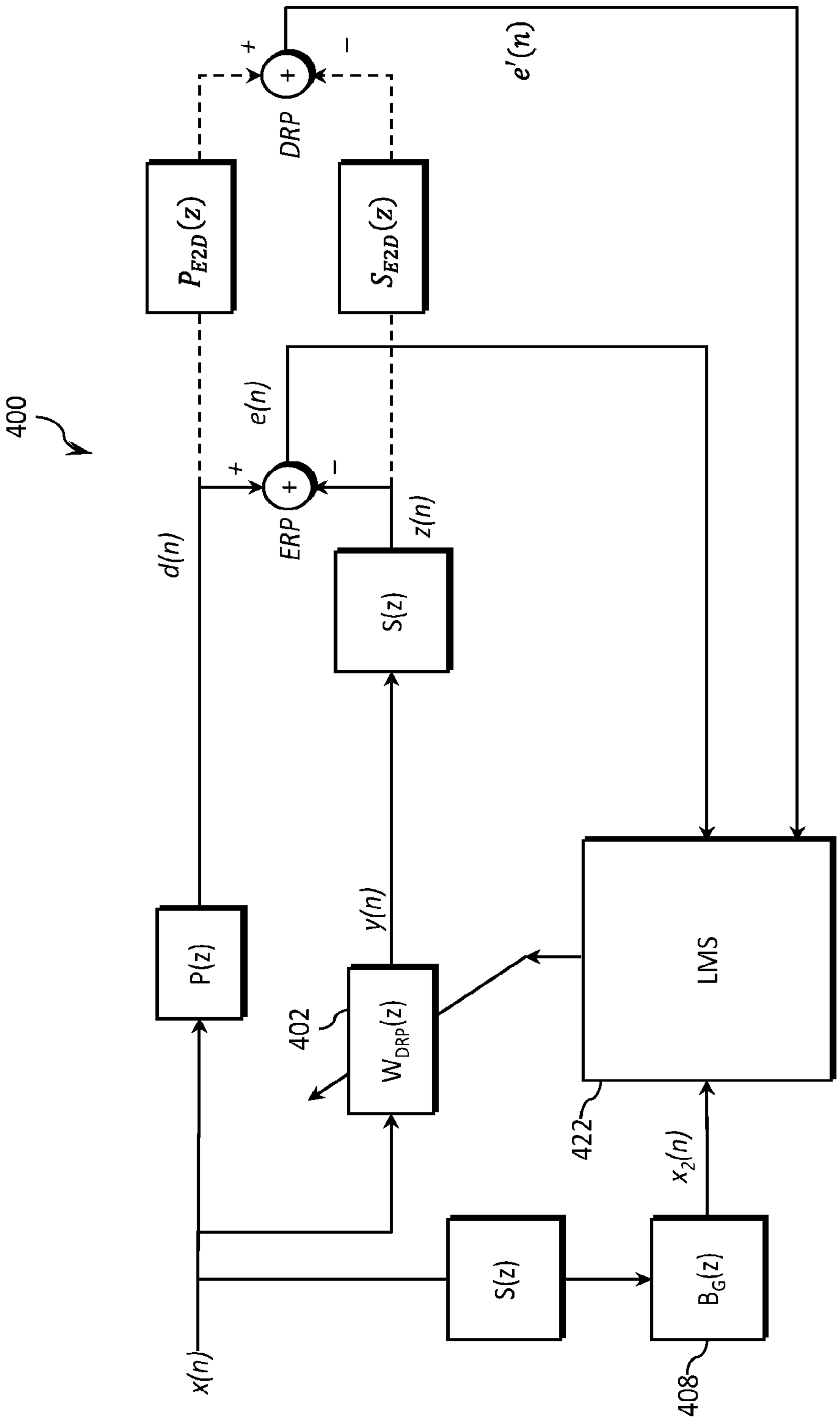
FIGS. 4A and 4B illustrate example adaptive gain control tuning and use implementations, in accordance with one or more embodiments.
Figure 4B:
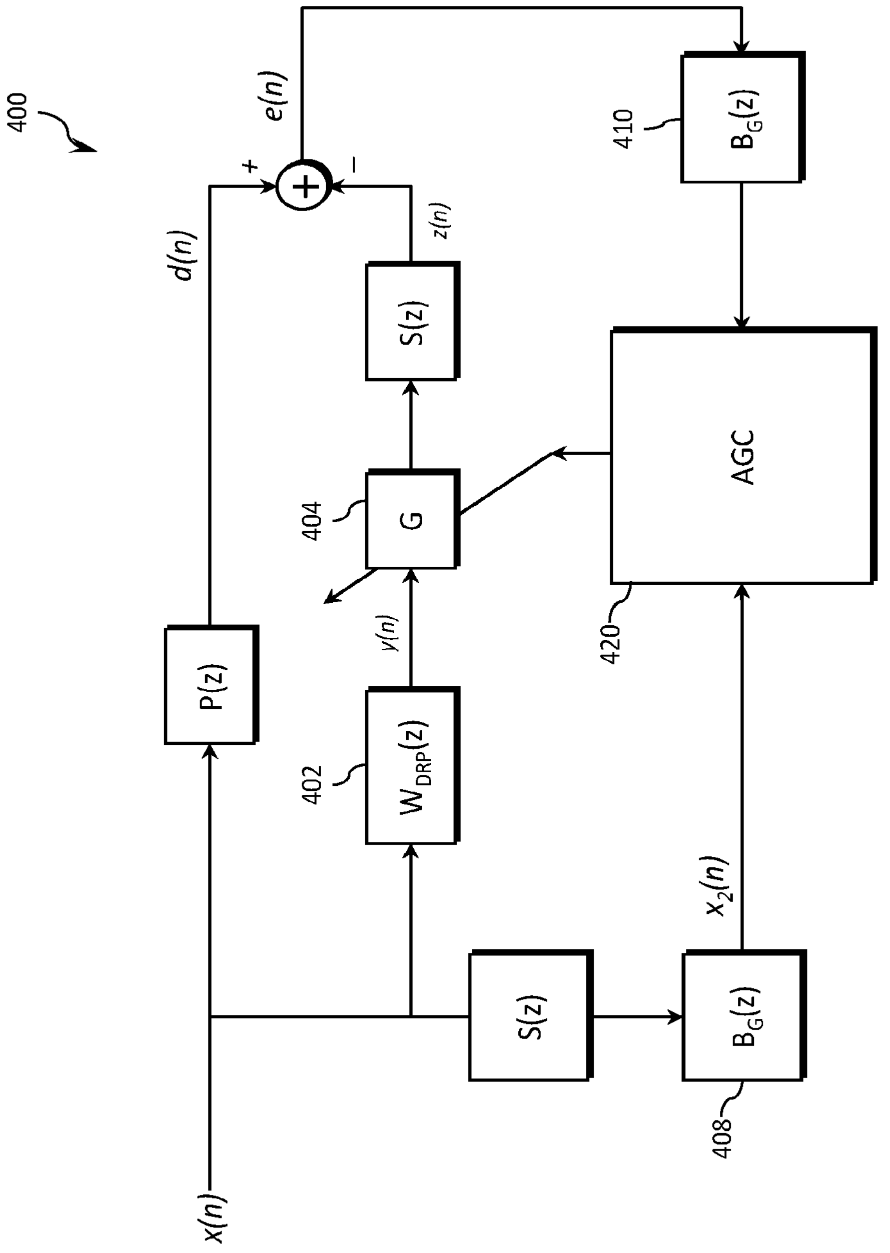

Referring to FIGS. 4A and 4B, embodiments of an adaptive gain (ADG) subsystem 400 are disclosed. In various embodiments, adaptive gain control logic 420 continuously updates an adjustable gain filter 404 to adjust for variations in the coupling paths. The inputs to the ADG 420 may be conditioned using a programmable filter BG(z) (e.g., programmable filter 408 and programmable filter 410), which is designed to protect against low frequency transients and high frequencies distractors in the environment. In some embodiments, the filter BG(z) may comprise a low pass filter and/or a band pass filter that further filters out very low frequencies (e.g., <20 Hz that cannot be heard out of a loudspeaker).

As previously discussed, the physical geometries and person-to-person fit variations of the personal listening device can affect noise cancellation performance. For example, the shape of the outer ear and length of the ear canal can alter the acoustic transfer functions of interest in an ANC system. In some embodiments, an ANC system in a personal listening device (e.g., the system of FIG. 1) uses a noise sensing reference microphone, an error microphone, and a DSP sub-system that generates the appropriate anti-noise to cancel the noise field as measured by the error microphone. This results in a cancellation zone where the degree of cancellation is maximized at the error microphone location and degrades inversely proportional to the wavelength. As a result, the cancellation performance at the eardrum (which is roughly 25 mm away from the error microphone) drops significantly for higher frequencies (lower wavelengths) leading to loss of cancellation bandwidth as perceived by the user of the noise cancelling system. The embodiments of FIGS. 4A-B address these and other issues by maximizing the cancellation bandwidth at the eardrum during the tuning stage and formulating an adaptive approach that uses the error microphone to adapt to user specific characteristics during operation.

For the purposes of this embodiment, let the error microphone location be termed as ERP (Error Reference Point) and the ear-drum location be termed as DRP (Drum Reference Point). For ANC systems tuned at the DRP, the error microphone is a good indicator of low frequency cancellation at DRP and hence a robust error correcting signal can be derived from a low-passed version of the error microphone signal. This correcting signal may then be used to adapt a gain in the anti-noise signal path.

To maximize cancellation, an ideal placement of an error microphone would be at the eardrum, but that location is not practical for many consumer devices. Thus, the ERP is used to provide a practical signal that is roughly indicative of the cancellation performance at the DRP. The adaptive algorithm attempts to minimize the ERP signal which results in (i) diminished cancellation at high frequency signals at the DRP, and (ii) higher possibility of hiss sounding artefacts due to constructive interference of high frequencies at the DRP. In conventional approaches, adaptive algorithms are employed that use the transfer function from ERP to DRP. These approaches have many drawbacks including that the transfer function estimation is inaccurate at high frequencies, low estimation accuracy can affect the broad band cancellation performance and cause transitory hiss levels, high computational costs, and difficulty to tune and calibrate for all use conditions making deployment impractical for many devices. The embodiments of FIGS. 4A-B provide a computationally inexpensive approach that overcomes many of the drawbacks of conventional systems, is easy to tune, for example by measuring certain transfer functions during system design and is self-calibrating.

FIG. 4A illustrates a calibration and tuning arrangement for the adaptive gain subsystem. In this arrangement, the ANC filter 402 is optimized to cancel noise at the DRP during an initial tuning stage. In one embodiment, the device is placed on a head and torso simulator which has a second error microphone at the DRP. $P_{E2D}(Z)$, $S_{E2D}(z)$ model the ERP to DRP transfer functions in the denoted acoustic paths. The system can then be optimized using least mean squares block 422 to perform ANC tuning to derive an optimum $W_{DR}p(Z)$, based on the error signal, e' (n). Tuning in this manner helps achieve extended cancellation bandwidth and better performance in high frequency bands. In various embodiments, the device is placed in various position (e.g., secure fit, misaligned, improper insertion depth, etc.), fit (e.g., different head and ear anatomies), configuration (e.g., removable tips on an earbud), and wear scenarios to tune ANC performance for different leakage conditions. In various embodiments, the various scenarios may be grouped by associated adaptive gain values to create profiles for optimizing ANC performance for various leakage scenarios.

As illustrated in FIG. 4B, the adaptive algorithm is set-up to continuously update a gain element, G, that empowers the system to adjust for variations in the various coupling paths.

In some embodiments, the signal is low pass filtered and gain adjusted for good low frequency cancellation. The inputs to the adaptive algorithms may be conditioned using a programmable filter, $B_G(z)$, which is programmed such that the ERP signal can mimic the cancellation performance at DRP. Additionally, $B_G(z)$, can be programmed to optimize performance during low frequency transients and high frequency distractors in the environment. It will be appreciated that the embodiments of FIGS. 4A-B are example implementations, and that the approaches disclosed therein can be modified for adaptive versions of feedback, feedforward and hybrid ANC solutions.

Figure 5A:
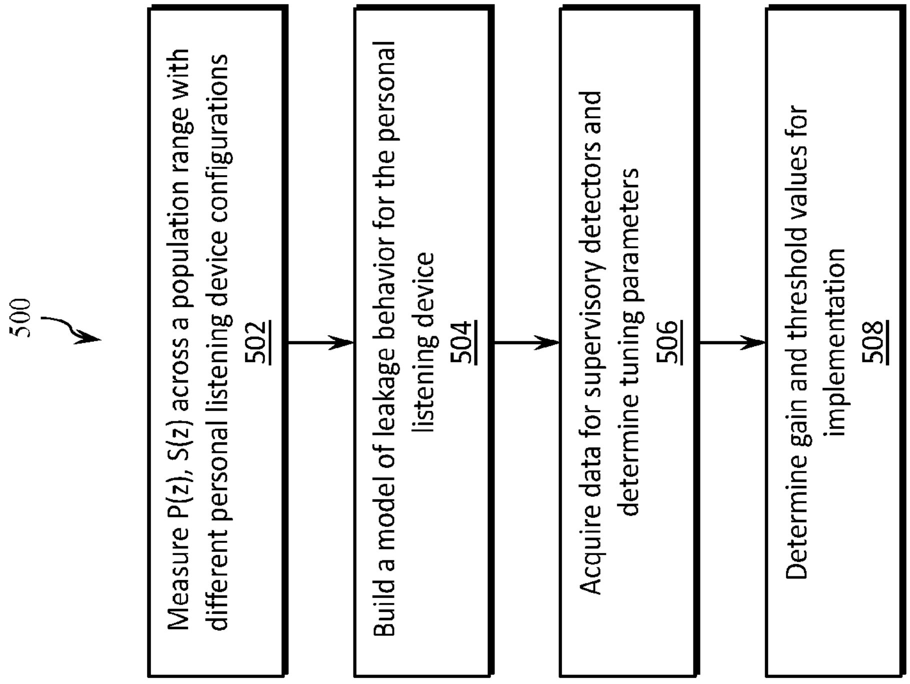
FIG. 5A is a flow diagram illustrating an example process for creating leakage profiles, in accordance with one or more embodiments.
Figure 5B:
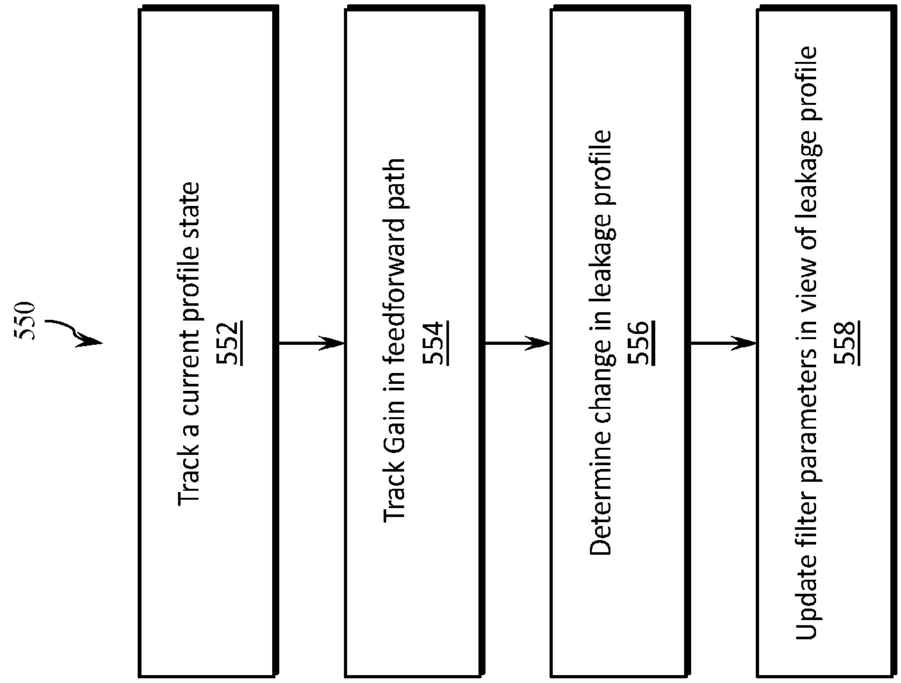
FIG. 5B is a flow diagram illustrating an example process for gain adjusted profile switching, in accordance with one or more embodiments.

Referring to FIGS. 5A and 5B, methods for operating the ANC systems (e.g., the systems of FIGS. 1-4B and FIG. 7) to detect ear coupling using adaptive gain control parameters and select among available leakage profiles will now be described, in accordance with one or more embodiments. A configuration process 500 begins in step 502 by estimating transfer functions for a primary path P(z) and secondary path S(z) for a personal listening device across a population range and using different device customizations (e.g., different sized tips for an earbud). In step 504, a model of leakage behavior for the device is generated, which may include one or more gain parameters and coefficients for one or more tuned adaptive filters. In step 506, the process acquires data for supervisory detectors of the adaptation engine and determines tuning parameters. In some embodiments, a fixed number of profiles is generated (e.g., four profiles), representing variations in coupling between the personal listening device and the person's ear or head. The profiles may be selected to cover a range of leakage factors and/or a range of common personal listening device configurations and positions/fits, such as a tight coupling configuration, an open air (or highly leaky) configuration and intermediate leaky scenarios.

In step 508, gain and threshold values for the different leakage scenarios are determined. In one embodiment, a profile representing a tight coupling between the personal listening device and the user's ear/head may be associated with a gain value and a threshold that may be used to trigger a change in profile. For example, when the gain value is above a first predetermined threshold, the profile switches to a second profile associated with a second (e.g., higher) gain factor. The second profile may have an upper threshold, above the which the profile switches to a third profile associated with a third (e.g., higher) gain factor. The second profile may also have a lower threshold, below which the profile switches back to the first profile. Additional profiles are defined in a similar manner with a gain value associated with the tuned leakage profile and a threshold range in which the filter provides acceptable performance (e.g., as determined by system requirements). In one embodiment, the gain ranges define a range of ANC performance that meets or exceed the performance standards for the personal listening device. For example, as a gain value deviates more from the profile gain value, the performance degrades and a new profile, defined by a new gain value and upper and lower thresholds is defined and tuned.

A method 550 for operating an ANC system comprises, in step 552, tracking a current profile state, including a gain value and upper and lower thresholds, as available, for the current profile. In step 554, the method 550 tracks the gain parameters of the adaptive gain controller in the feedforward path. In step 556, the tracked gain parameters are compared to the current threshold values to determine whether there has been a change in the leakage profile. If the tracked gain value is higher than the current upper threshold or lower than a lower threshold, then the process switches to the appropriate profile. In step 558, the parameters for the adaptive filters of the ANC system are updated to implement the current leakage profile.

Figure 6:
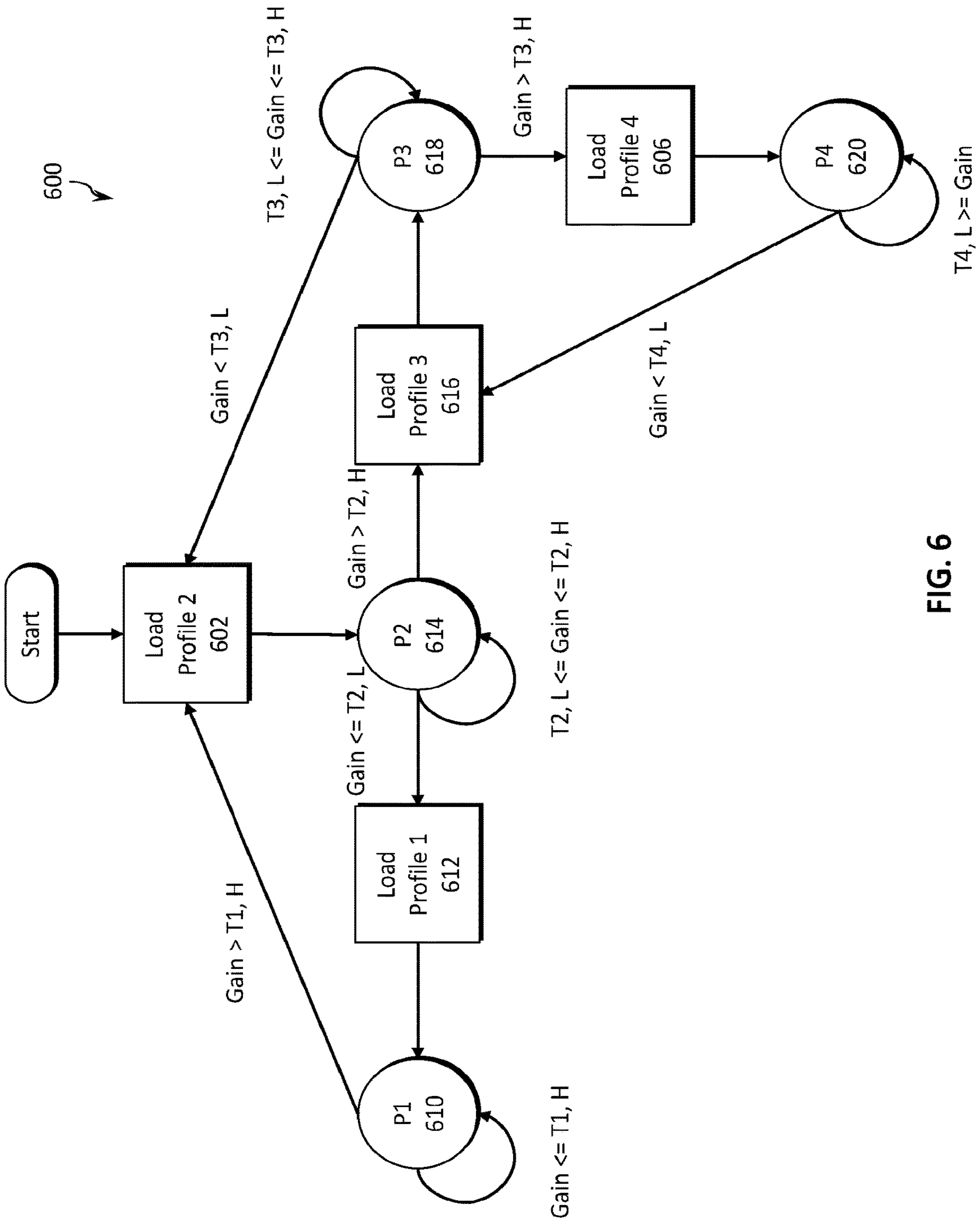
FIG. 6 is a state diagram illustrating an example profile switching process, in accordance with one or more embodiment.

Referring to FIG. 6, an example profile switching process 600 will be described in further detail, in accordance with one or more embodiments. The profile switching process 600 switches between four pre-defined profiles, numbered 1-4 in the illustrated embodiment. A first profile (e.g., Profile 1) is tuned for the tightest seal, where coupling is the highest, and the fourth profile (e.g., Profile 4) is tuned for a leaky scenario, such as where the device is substantially out of position. The remaining two profiles cover intermediate leakage scenarios. It will be appreciated that although four profiles are used in the illustrated embodiment, the number of profiles used may be more or less in a particular implementation.

In various embodiments, each profile is tuned for a particular gain value/leakage scenario and includes a high (H) and low (L) threshold value, defining a range of operation for each profile. When the detected gain is within the high (H) and low (L) threshold values of a profile, that profile will be active. Together, the threshold ranges for the pre-defined profiles span a range of gain values that may be encountered during use. In some embodiments, each profile is tuned to provide acceptable ANC performance around a baseline gain value, and the threshold values are defined to fall within a range of gain values that produce acceptable ANC performance for the tuned profile.

The profile switching process 600 starts by loading the parameters associated with profile 2 at step 602. Control moves to step 614, where the ANC system processes the anti-noise signal using profile 2. The ANC system includes an adaptive gain filter in the feedforward path, which converges on a current gain value. The current gain is tracked and compared to an upper threshold T2, H and a lower threshold T2, L. The process state remains at step 614 while the gain is within the threshold range. If the gain falls below the lower threshold (T2, L), then profile 1 is loaded in step 612, and control moves to step 610 to process anti-noise signal using profile 1 while the gain is less than an upper threshold (e.g., gain is less than or equal to T1, H). If the gain exceeds the upper threshold T1, H, then control passes to step 602, the profile 2 is loaded and control passes to step 614 as previously discussed.

As step 614, if the gain value exceeds the threshold upper limit (e.g., T2, H), then control passes to step 616 to load profile 3, and control passes to step 618, which performs ANC processing while the adaptive gain value is between a lower threshold limit T3, L and an upper threshold limit T3, H. If the gain is lower than the lower threshold limit T3, L, then control passes back to step 602 to load profile 2. If the gain exceeds the higher threshold limit T3, H, then control passes to step 606, where profile 6 is loaded, and then to step 620 where ANC processing using profile 4 will continue while the gain exceeds the lower threshold limit T4, L. If the gain falls below the lower threshold T4, L, then control passes back to step 616 to load profile 3 for ANC processing.

Figure 7:
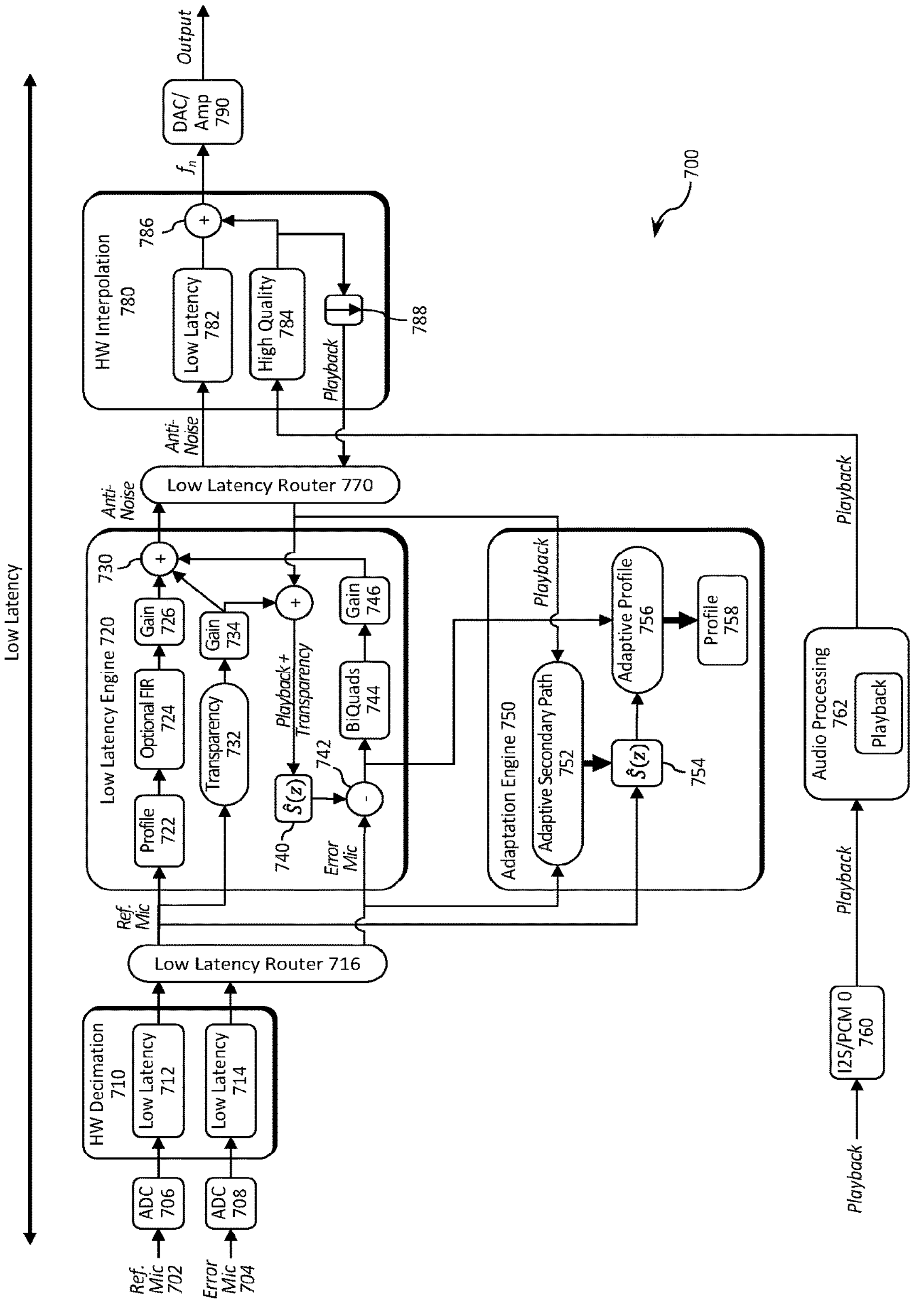
FIG. 7 illustrates an example implementation of a hybrid ANC system, in accordance with one or more embodiments.

Referring to FIG. 7, an example implementation of a low latency hybrid ANC system 700 that may be used to implement one or more embodiments of the present disclosure will now be described. The hybrid ANC system 700 includes a reference microphone 702 and an error microphone 704 that convert sensed sounds into electronic analog signals. The reference microphone signal is converted to digital through analog-to-digital converter 706, and the error microphone signal is converted to digital through analog-to-digital converter 708. The microphones may include any device that senses sound waves and converts the sensed sound into electronic signals, such as a piezoelectric microphone, a microelectromechanical system microphone, audio transducer or similar device. In various embodiments, the hybrid ANC system may include one or more additional microphones, the microphones may include digital microphones that generate digital audio signals (e.g., eliminating the requirement of a separate analog-to-digital converter), and/or other modifications may be made consistent with the teachings of the present disclosure.

Hardware decimation unit 710 receives and downsamples the digital audio signals for processing by the ANC system. In the illustrated embodiment, the reference microphone signal is downsampled through a low latency decimation circuitry 712, and the error microphone signal is downsampled through a low latency decimation circuitry 714, and the signals are passed to a low latency router 716, which routes the signals to various components of the hybrid ANC system 700 for processing.

In the illustrated embodiment, the hybrid ANC system 700 includes a low latency engine 720 that includes a feedforward ANC path, a parallel transparency path, and a feedback ANC path. The low latency engine 720 may be implemented in hardware, software or a combination of hardware and software. In some embodiments, the low latency engine 720 may be implemented as a single sample processor, a digital signal processor, a controller, a processor and memory storing instructions, and/or other logic device capable of low latency ANC processing described herein. As illustrated, the feedforward path includes a processing profile 722 comprising tuning and other parameters for generating an anti-noise signal from the reference signal, optional finite impulse response filters 724 and an adaptive gain component 726.

A feedback path receives the error microphone signal and is configured to remove the playback signal (e.g., at component 742), which is filtered by secondary path filter 740 to account for secondary path effects. The feedback path further includes a plurality of BiQuads 744 (e.g., 12 BiQuads) configured to implement an infinite impulse response filter, and a gain component 746.

The low latency engine 720 also includes a transparency signal processing path that receives the reference microphone signal, adaptively filters the reference microphone signal (e.g., through transparency processing components 732), and applies a gain 734. In the illustrated embodiment, the transparency processing components run in parallel with the ANC processing and can be run with ANC enabled or disabled. The outputs of the feedforward path, feedback path and transparency path (if transparency mode is activated) are combined at mixing component 730 to generate an anti-noise signal. A low latency router 770 routes signals between the low latency engine, a hardware interpolation unit 780, which is adapted to upsample the anti-noise signal for output, and an adaptation engine 750. The hardware interpolation unit 780 includes low latency circuitry 782 for upsampling the anti-noise signal, a high quality upsampling circuitry 784 configured to receive a playback signal and generate a high-quality audio signal for output. The upsampled anti-noise signal and playback signal are combined at component 786, fed to a digital to analog converter and amplifier 790, which drives the output (e.g., for output through a loudspeaker).

[The hardware interpolation unit 780 further includes a downsampler 788 for feeding the playback signal into the low latency engine 720 and adaptation engine 750 for further processing (e.g., removal of the playback signal from a received error microphone signal).

The adaptation engine 750 supervises the ANC processing and controls one or more components of the low latency engine 720 during operation to optimize ANC performance. The adaptation engine 750 may be implemented using a single sample processor, a numerical processing unit, a digital signal processor or other logic device and/or processing system. In the illustrated embodiment, the adaptation engine 750 includes components for adaptive secondary path processing 752, an estimated secondary path filter 754, adaptive profile processing 756 and profile selection 758. The adaptation engine 750 may be configured to provide adaptive leakage compensation by tracking and compensating for leakage differences (e.g., by selectively switching profiles). In various embodiments, the adaptation engine 750 may include other processing components and control, such as howling control, wind control, ambient control, and other control logic. In some embodiments, additional detectors may be included (e.g., howling detector, wind detector, etc.) to provide input to one or more detectors, and the control elements may provide compensation for detected conditions by modifying the adaptation profile, one or more parameters of an adaptive filter (e.g., gain control to for howling compensation).

The hybrid ANC system 700 receives the audio playback from a separate device via an audio interface 760 such as $I^2S$, PCM, or other interface protocol. The received playback signal is processed by audio processing components 762, which may include an audio codec and other components configured to modify the playback signal for output.

Ambient Detector for Dual Mode ANC

Figure 8:
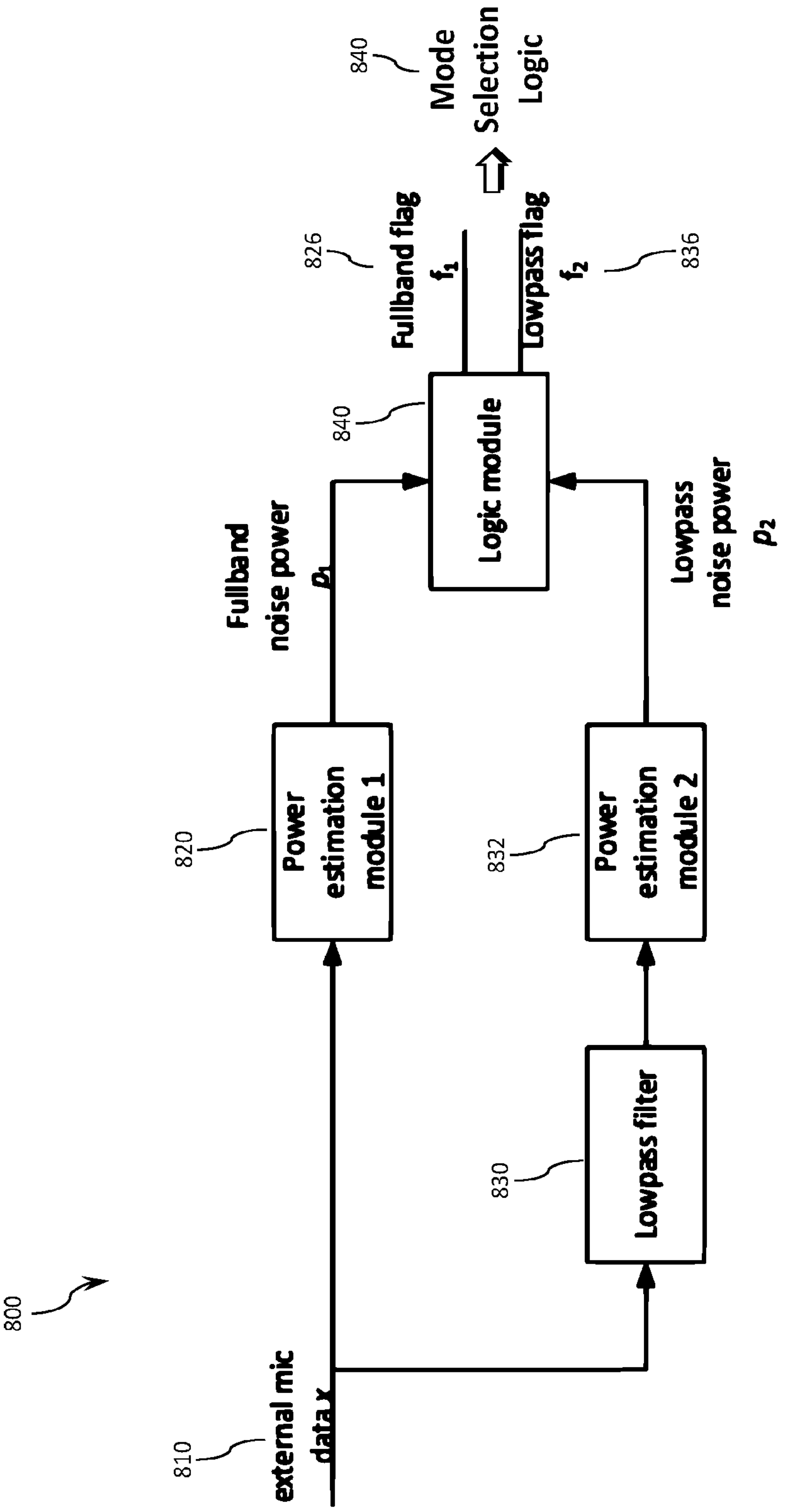
FIG. 8 illustrates an example ambient detection and ANC mode selection system, in accordance with one or more embodiments.
Figure 9:
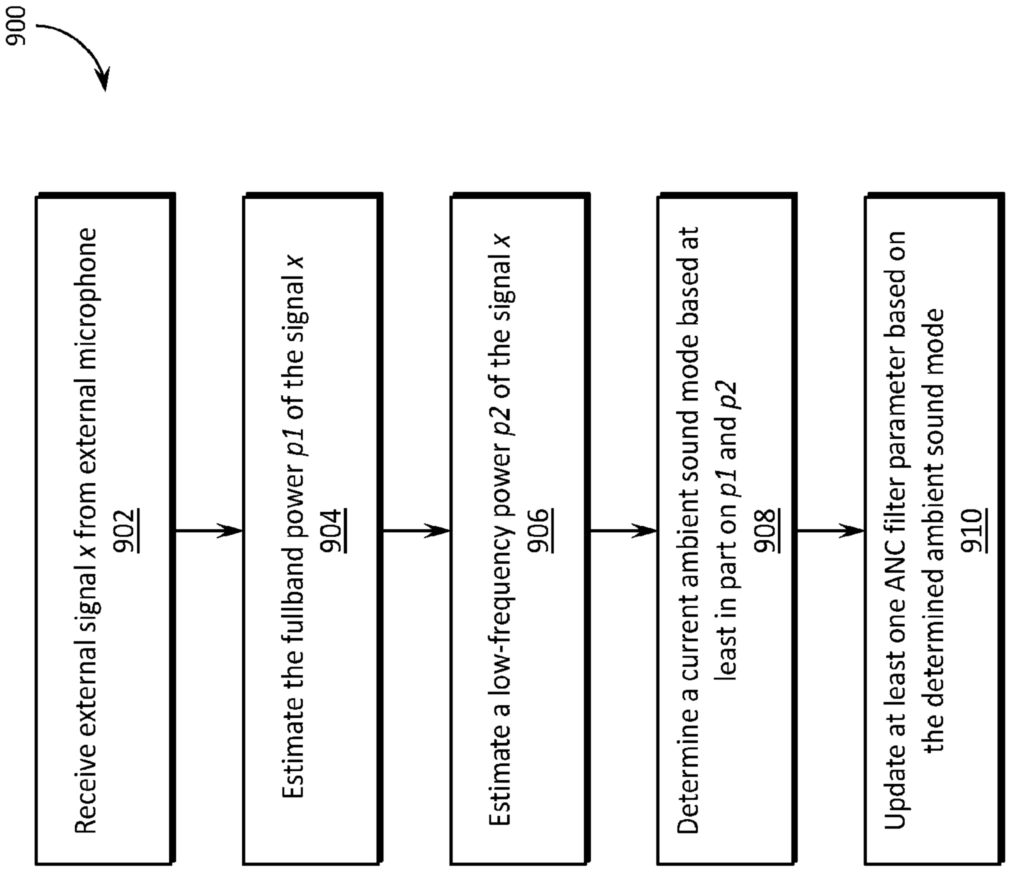
FIG. 9 illustrates an example ambient detection and ANC mode selection method, in accordance with one or more embodiments.

Referring to FIGS. 8 and 9, embodiments for detecting an ambient condition and adapting the ANC system to the detected noise conditions will now be described. In some embodiments, detector circuitry/logic is incorporated into the ANC system to monitor the ambient noise spectrum shape and select an appropriate ANC mode. This circuitry may be incorporated into any ANC system configured to switch operating modes, including the ANC systems disclosed in FIGS. 1-7 herein. In various embodiments, the ambient detection components and mode selection logic may be incorporated as standalone components, incorporated as logic components in a digital signal processor, implemented as an adaptation engine (e.g., adaptation engine 280), and/or other logical components and/or circuitry.

In the illustrated embodiment, a system 800 (e.g., components of a personal listening device) is equipped with an external microphone 810 (e.g., reference audio sensor 140 of FIG. 1, microphone 212 of FIG. 2, and/or other external microphone) to receive an ambient noise signal x. A first power estimation module 820 tracks the power of the signal x and outputs a fullband noise power value p1. A second processing path processes the received ambient noise signal x through a low pass filter 830 and second power estimation module 832 tracks the power of the signal to generate a corresponding low frequency power value p2. A logic module 840 and/or logic circuitry outputs a plurality of flags identifying a detected ambient noise condition (e.g., based on p1 and p2) and output ANC mode flags indicating the current detected ambient noise condition. The flags 826 and 836 are input to mode selection logic 840 to select one or more ANC modes. For example, an ANC system, such as the system illustrated in FIG. 2, includes a plurality of filters (e.g., filters 214, 216, 218, 223, 224, 270, 272, 290, and other filters) tuned according to certain tuning parameters. The ANC system may include any number and/or types of filters depending on the ANC implementation. The mode selection logic 840 (which may be implemented in circuitry, digital logic, a digital signal processor, an adaptation engine, etc.) receives the flags 826 and 836 (and/or other flags, depending on the implementation), determines a current ANC mode, and updates one or more filter parameters to tune the ANC system to optimize ANC processing for the detected ambient condition.

In various embodiments, the system 800 uses the power estimation modules 820 and 830 to track long term ambient noise. The power estimation modules 820 and 830 can be configured to ignore short-term bursts of noise (e.g., a door slam, a keyboard click, etc.). Various estimation methods may be used including (i) exponential smoothing (e.g., $p=(1-Op+ax\text{-}^2)$; (ii) a release window method, where p is the minimum, median, a certain percentile of $x^2$ within a predetermined release window (e.g., 1 second); and/or (iii) long-short dual trackers, where the system uses a long-term power tracker to update p towards a long-term goal P by $p=(1-cuon_g)p+alon_gP$, and the system uses a short-term power tracker to evaluated noise statistics and update P. Examples of a short-term power tracker include, but are not limited to:

$P_{short}=(1-a_{short})+a_{short}x2$, where the system updates $P=f(P_{short})$ if $P_{short}$ and P are close;

$P_{short}=x2$, where the system updates $P=f(P_{short})$ if the $P_{short}$ distribution satisfies the requirement in a release window; and/or $fP_{short}$ is a function of $P_{short}$, e.g. average, minimum, or any other linear or nonlinear functions.

A method for performing ambient detection and mode switching will now be described with reference to FIG. 9.

In various embodiments, the logic module translates the power estimates pl and p2 to ANC mode flags. In the illustrated embodiments, the logic module includes thresholds that are compared against the measured power estimates to set each flag. In one embodiment, the logic for setting the flags and the ANC modes are illustrated in the following table

| Fullband flag fi ($p_i > th_1$ | Low-freq flag $1_2$ ($p_i > th_2$ & $p_i - p_z < th_3$) | Meaning | ANC operation choices |
|---|---|---|---|
| 0 | 0 | Quiet background | 1. Do nothing<br>2. Turn off ANC |
| 0 | 1 | Bug/unknown | 1. Do nothing<br>2. Return to default mode |
| 1 | 0 | Wideband noise | Switch to wideband tuning |
| 1 | 1 | Low-frequency dominant noise | Switch to low-freq tuning |

For example, if pl is greater than a first threshold, then the first flag is set to "on", otherwise the first flag is set to "off". If pl is greater than a second threshold and pl-p2 are less than a third threshold, then a second flag is set, otherwise, the second flag is off. If the flags are both off, then the ANC system is operating in a quiet environment and the ANC may be turned off. If only the second flag is turned on, then an error is detected, and the ANC returns to a default mode of operation. If the first flag is on and the second flag is off, then wideband noise is detected and the ANC operation switches to a wideband tuning. If both flags are on, then low-frequency dominant noise is detected and the ANC system switches to a low-frequency tuning.

In other embodiments, the proposed systems and methods for ambient detection can be run in the time domain and/or frequency domain. In the time domain, the external noise can be sample based and frame based. The low pass filter may comprise an infinite impulse response filter, a finite impulse response filter, and/or other low pass filter type. The proposed embodiments can be extended to handle more ANC modes by adding more filter/power estimation module paths.

Referring to FIG. 9, an example method for detecting an ambient sound mode and switching to an ANC mode based on the detected ambient sound mode will now be described in accordance with one or more embodiments. A process 900 starts in step 902 by receiving an external signal x from an external microphone representing ambient sound. In step 904, the system estimates the fullband power p/ of the signal x. In step 906, the system estimates a low-frequency power p2 of the signal x. In step 908, the system determines a current ambient sound mode based at least in part on the values pl and p2. In various embodiments, the determination of step 908 may be made, for example, by comparing the values pl and p2 to one or more thresholds and setting one or more flags representing an ANC mode. In step 910, the system updates at least one ANC filter parameter based on the determined ambient sound mode.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed:

1. An active noise cancelation system comprising:

a feedforward path comprising an adaptive filter configured to receive a reference signal corresponding to ambient noise and adaptively generate an anti-noise signal to cancel the ambient noise; and a logic device configured to:

determine a fullband power of the reference signal;

determine a low-frequency power of the reference signal;

determine an ambient noise condition based at least in part on the reference signal; and select a current ambient sound mode from a set of three or more sound modes based at least in part on determining whether the fullband power of the reference signal and the low-frequency power of the reference signal correspond to wideband noise and not low-frequency dominant noise.

2. The active noise cancelation system as recited in claim 1, wherein the adaptive filter is tuned based at least in part on the ambient noise condition.

3. The active noise cancelation system as recited in claim 1, wherein the set of three or more sound modes comprises a plurality of active noise cancelation modes.

4. The active noise cancelation system as recited in claim 3, wherein the set of three or more sound modes comprises a sound mode in which active noise cancelation is turned off.

5. The active noise cancelation system as recited in claim 3, wherein the fullband power of the reference signal and the low-frequency power of the reference signal correspond to wideband noise, and the plurality of active noise cancelation modes comprises an active noise cancelation mode corresponding to wideband tuning.

6. The active noise cancelation system as recited in claim 3, wherein the fullband power of the reference signal and the low-frequency power of the reference signal correspond to low-frequency dominant noise, and the plurality of active noise cancelation modes comprises an active noise cancelation mode corresponding to low-frequency tuning.

7. The active noise cancelation system as recited in claim 1, wherein the logic device is further configured to determine an ear coupling status.

8. The active noise cancelation system as recited in claim 7, wherein the ear coupling status corresponds to leakage and the logic device is further configured to cause one or more adjustments to the active noise cancelation system based at least in part on the leakage.

9. A method comprising:

receiving a reference signal corresponding to ambient noise;

adaptively generating an anti-noise signal to cancel the ambient noise;

determining a fullband power of the reference signal;

determining a low-frequency power of the reference signal;

determining an ambient noise condition based at least in part on the reference signal; and selecting a current ambient sound mode from a set of three or more sound modes based at least in part on determining whether the fullband power of the reference signal and the low-frequency power of the reference signal correspond to wideband noise and not low-frequency dominant noise.

10. The method as recited in claim 9, further comprising tuning an adaptive filter based at least in part on the ambient noise condition.

11. The method as recited in claim 9, wherein the set of three or more sound modes comprises a plurality of active noise cancelation modes.

12. The method as recited in claim 11, wherein the set of three or more sound modes comprises a sound mode in which active noise cancelation is turned off.

13. The method as recited in claim 11, wherein the fullband power of the reference signal and the low-frequency power of the reference signal correspond to wideband noise, and the plurality of active noise cancelation modes comprises an active noise cancelation mode corresponding to wideband tuning.

14. The method as recited in claim 11, wherein the fullband power of the reference signal and the low-frequency power of the reference signal correspond to low-frequency dominant noise, and the plurality of active noise cancelation modes comprises an active noise cancelation mode corresponding to low-frequency tuning.

15. The method as recited in claim 9, further comprising determining an ear coupling status.

16. The method as recited in claim 15, wherein the ear coupling status corresponds to leakage and the method further comprises causing one or more adjustments based at least in part on the leakage.

17. One or more non-transitory, machine-readable media having machine-readable instructions thereon which, when executed by one or more processing devices, cause the one or more processing devices to perform operations comprising:

receiving a reference signal corresponding to ambient noise;

adaptively generating an anti-noise signal to cancel the ambient noise;

determining a fullband power of the reference signal;

determining a low-frequency power of the reference signal;

determining an ambient noise condition based at least in part on the reference signal; and selecting a current ambient sound mode from a set of three or more sound modes based at least in part on determining whether the fullband power of the reference signal and the low-frequency power of the reference signal correspond to wideband noise and not low-frequency dominant noise.

18. The one or more non-transitory, machine-readable media as recited in claim 17, the operations further comprising tuning an adaptive filter based at least in part on the ambient noise condition.

19. The one or more non-transitory, machine-readable media as recited in claim 17, wherein the set of three or more sound modes comprises a plurality of active noise cancelation modes.

20. The one or more non-transitory, machine-readable media as recited in claim 19, wherein the set of three or more sound modes comprises a sound mode in which active noise cancelation is turned off.

* * * * *